Aug. 29, 1961  H. S. FRIEDMAN ET AL  2,997,916
TELESCOPIC GUN SIGHT HAVING AXIALLY ADJUSTABLE
EYEPIECE AND PARALLAX TUBE
Filed Feb. 20, 1959
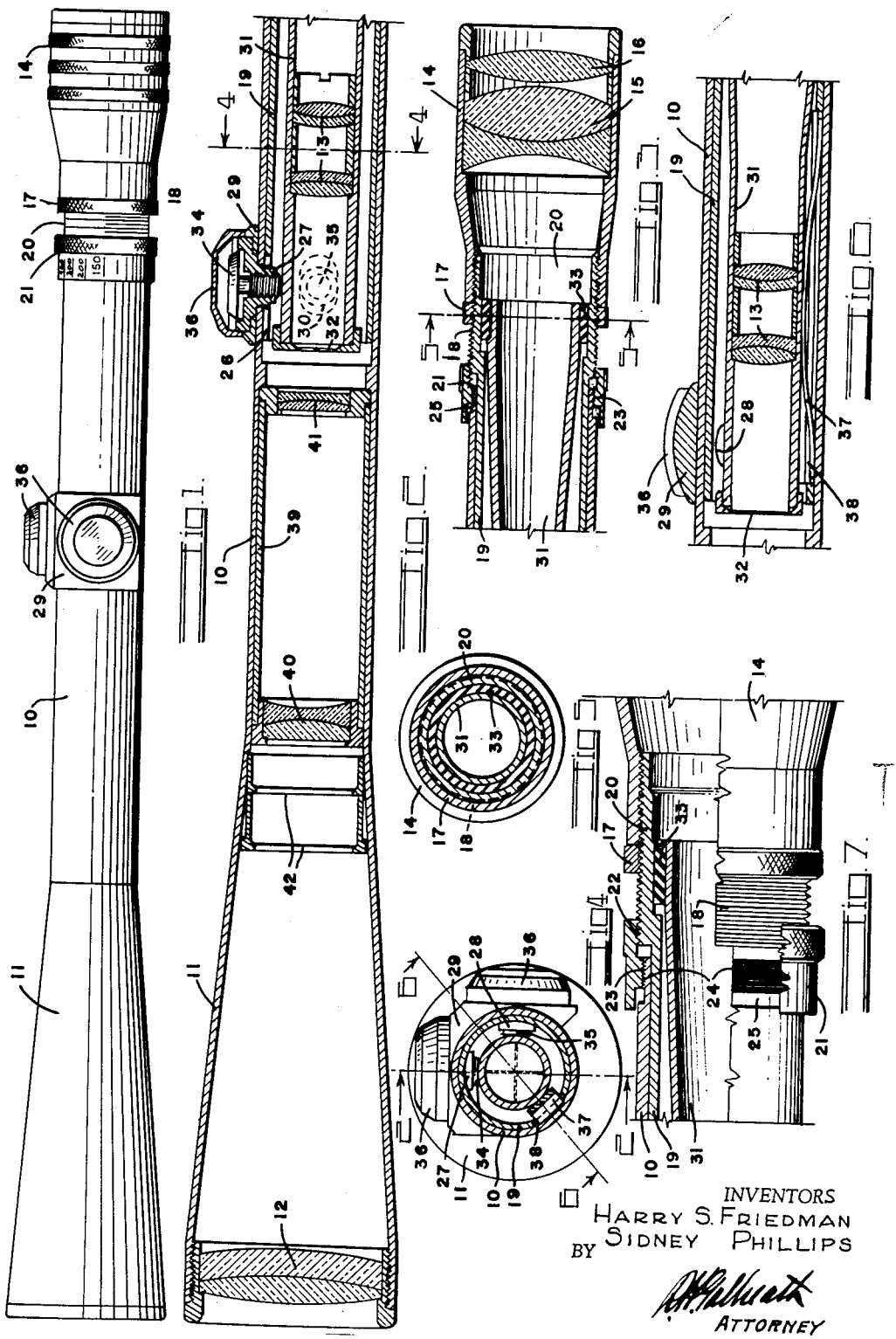
INVENTORS
HARRY S. FRIEDMAN
SIDNEY PHILLIPS
BY
ATTORNEY

United States Patent Office 2,997,916
Patented Aug. 29, 1961

2,997,916
TELESCOPIC GUN SIGHT HAVING AXIALLY ADJUSTABLE EYEPIECE AND PARALLAX TUBE
Harry S. Friedman, Northampton, and Sidney Phillips, Florence, Mass., assignors, by mesne assignments, to Redfield Gun Sight Co., Denver, Colo., a limited partnership of Colorado
Filed Feb. 20, 1959, Ser. No. 794,644
3 Claims. (Cl. 88—32)

This invention relates to a telescopic gun sight or "riflescope" and while more particularly directed to a "scope" of the type used on hunting rifles it is, of course, not limited to this particular use but will be found to be a valuable addition to all types of telescopic gun sights.

The principal object of the invention is to provide a relatively simple, economical and lightweight gun sighting telescope in which the erector lenses and the sighting reticle will be accurately and permanently associated as an integral unit, so as to maintain the reticle centered in accurate focus in the field of view at all adjusted positions for windage and elevation and to provide an objective optical system of relatively great focal length in a scope of relatively short length.

Another object of this invention is to permanently and resiliently mount the above reticle and erector lens unit in a parallax adjusting tube which can be installed by simply sliding it into the barrel of the scope and to provide a simple, accurate and readily calibrated means on the exterior of the barrel for simultaneously and axially adjusting the eye lenses and the parallax adjusting tube so that parallax will be automatically eliminated at any range setting and to provide a scope having the above advantages in which the many links, slides, screws, pivots, and mechanical mountings usually employed are eliminated so that the number of parts required is reduced to a minimum.

A further object is to provide a calibrated target type focus adjustment which will be free from back lash and lost motion due to thread tolerances and in which there will be no axial movement of the windage and elevation adjustments during focusing of the scope.

Other objects and advantages reside in the detail construction of the invention, which is designed for simplicity, economy, and efficiency. These will become more apparent from the following description.

In the following detailed description of the invention, reference is had to the acompanying drawing which forms a part hereof. Like numerals refer to like parts in all views of the drawing and through the description.

In the drawing:

FIG. 1 is a side view of a telescopic gun sight in which this invention is embodied;

FIG. 2 is an enlarged longitudinal section through the forward portion of the sight of FIG. 1 taken on the line 2—2, FIG. 4;

FIG. 3 is a continuation of the longitudinal section of FIG. 2 through the rear portion of the sight;

FIG. 4 is a cross section taken on the line 4—4, FIG. 2;

FIG. 5 is a similar cross section taken on the line 5—5, FIG. 3;

FIG. 6 is a fragmentary longitudinal section taken on the line 6—6, FIG. 4; and

FIG. 7 is a still further enlarged side view, partially broken away, of the parallax adjusting and range focusing portion of the improved sight.

Conventional parts of a typical rifle scope are designated by numeral as follows: main tube 10, enlarged objective extremity on main tube 11, eyepiece mount 14, field lens combination 15, eye lens 16, and eyepiece locking ring 17.

In the conventional scope, the eyepiece mount 14 is threaded onto the rear extremity of the main tube 10 for focusing purposes and is locked in the adjusted position by threading the locking ring 17 thereagainst. In this improved scope, however, the conventional eyepiece mount 14 and the conventional locking ring 17 are threaded on the rear extremity of what will be herein designated as a parallax adjusting tube 19 fitted within the rear extremity of the main tube 10. The parallax adjusting tube 19 is of a diameter, for the major portion of its length, to slide with slight clearance within the main tube 10. An enlarged rear extremity 20 is formed upon the parallax adjusting tube 19. The enlarged rear extremity 20 has an outer diameter substantially corresponding to the outer diameter of the main tube 10 and it is threaded, as shown at 18, to receive the eyepiece mount 14 and the locking ring 17.

The parallax adjusting tube 19 is longitudinally adjustable in the main tube 10 and this longitudinal adjustment is accomplished by means of a cylindrical parallax adjusting ring or sleeve 21. The adjusting sleeve 21 has internal threads 22 of a single lead at its rear extremity to thread onto the threads 18 of the threaded enlarged extremity 20 of the parallax adjusting tube 19. The adjusting sleeve 21 is also provided with medial internal threads 23 of a multiple lead to thread upon external threads 24 formed on a reduced rear extremity 25 of the main tube 10. The threads 24 and 18 differ in lead, as described above, to effect a "differential" thread movement between the parallax adjusting tube 19 and the main tube 10.

The top of the forward extremity of the parallax tube 19 is notched as shown at 26 to pass, with relatively close lateral tolerance, an elevation bushing 27 which is threaded vertically downward through the main tube 10. A similar windage bushing 28 is horizontally threaded through the main tube 10. The bushings 27 and 28 serve to maintain a yoke 29 upon the main tube 10 as is conventional in rifle scopes of this character. The windage bushing 28 extends through an axially elongated passage 30 in the side of the paralax tube 19. It can be seen that the bushing 27 will act as a key to prevent rotation of the parallax tube 19 in the main tube 10 and the bushing 28 will act to limit the amount of axial movement of the parallax adjusting tube 19 in the main tube 10.

An erector tube 31 is substantially concentrically spaced within the parallax adjusting tube 19. The erector tube 31 carries a conventional reticle 32 of any desired type, such as a cross hair, post, or dot pattern, at its forward extremity and also carries erector lens combinations 13 in proper focal position relative to the reticle 32. The rear extremity of the erector tube 31 is flared outwardly into close proximity with the internal cylindrical surface of the enlarged extremity 20 of the parallax adjusting tube 19 so as to provide an intervening annular space between the two. The latter annular space is filled with an annular band 33 of compressed resilient material such as rubber, neoprene, or the like. The band 33 is permanently attached to both, the adjusting tube extremity 20 and the external surface of the erector tube 31 in any desired manner such as by thermal welding. The resilient annular band 33 tends to resiliently support the erector tube in a concentric axial position within the parallax adjusting tube 19.

An elevation adjusting screw 34 is threaded downwardly through the elevation bushing 27 into contact with the erector tube 31 and a similar windage adjusting screw 35 is threaded horizontally through the windage bushing 28 into contact with the erector tube. The screws 34 and 35 may have any of the suitable constructions and arrangements at present in use in the art such as the customary index gauges and protecting caps 36, etc.

A leaf spring 37 is positioned in a longitudinally extending spring slot 38 in the parallax adjusting tube 19. The spring 37 is resiliently bowed so that its extremities frictionally bear against the inner surface of the main tube 10 and its midportion resiliently and frictionally bears against the erector tube 31 as shown in FIGS. 4 and 6. Thus, it can be seen that the erector tube 31 will be constantly urged against the extremities of the two adjusting screws 34 and 35 so that the position of the reticle 32 relative to the axis of the main tube 10 can be adjusted by simply adjusting the latter screws. The clearance between parallax adjusting tube 19 and the main tube 10 is slightly greater than normal clearance between the threads of the parallax adjusting sleeve 21 and tubes 10 and 19. The spring 37, however, radially displaces tubes 10 and 19 in opposite directions, thus causing the threads mating with the sleeve 21 to engage "surface to surface" at all times so as to completely eliminate backlash.

A spacer sleeve 39 is rigidly fitted within the main tube 10 forwardly of the reticle 32. The sleeve 39 carries an intermediate lens combination 40 at its forward extremity and a collector lens combination 41 at its rear extremity. The lens combinations 40 and 41, in combination with an objective lens combination 12 carried by the enlarged forward extremity 11 of the main tube 10, form an objective optical system which forms an inverted image of the target on the reticle 32 which is viewed, with the reticle, through the viewing optical system consisting of the erector lens combinations 13, the field lens combination 15 and the eye lens 16.

The erector lens combinations 13 each consist of a cemented combination of a crown lens and a flint lens. The field lens combination 15 consists of a cemented combination of a crown lens and a flint lens and the eye lens 16 consists of a second single element crown lens. The viewing optical system containing the erector lens combinations 13, the field lens combination 15, and the eye lens 16 is of the type found in the best designed and most expensive telescopic rifle sights but is not otherwise unusual.

The objective optical system, however, containing the objective lens 12, the intermediate lens combination 40 and the collector lens combination 41, produces a telephoto effect not found in conventional scopes. The objective lens combination 12 is positive, the intermediate lens combination 40 is negative and the collector lens combination 41 is positive with focal lengths, respectively, about 56%, 26% and 30% of the equivalent focal length of the objective combination. The objective lens combination 12 forms a real image. The intermediate lens combination 40 performs the function principally, of enlarging the focal length of the objective lens combination 12 and at the same, because of its position, forms, with the objective lens combination 12, a combination which is physically considerably shorter from the front surface of objective lens combination 12 to the focal point of the objective and intermediate lens combinations than a conventional telescope doublet objective of equivalent focal length. The collector lens combination 41 is principally a collector which directs the rays of light from the objective lens combination 12 and the intermediate lens combination 40 as required to be transmitted by the erector lens combinations 13 and the eyepiece combination 15 and 16. Suitable diaphragms 42 are positioned rearwardly of the objective lens combination 12 to limit and frame the field of view. Since the elements of the objective optical system are fixed, the position of the inverted image is fixed. The reticle can be brought into the image plane to eliminate parallax by adjustment of the adjusting sleeve 21.

Since the position of the reticle 32 is fixed relative to the erector lens combinations 13, it will always remain in focus with the latter lenses at all adjustments. Therefore, when the parallax adjusting tube is adjusted to place the reticle in the plane of the inverted image parallax will be automatically eliminated. The focus of the eyepiece lens combinations 15 and 16 is, of course, independent of the parallax adjustment and can be adjusted to the eye of the individual user so as to produce a clear picture of the image plane.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. A telescopic gun sight comprising: a main tube; an objective lens combination fixedly mounted in the forward extremity of said main tube; a parallax adjusting tube axially slidable in said main tube, the rear extremity of said parallax adjusting tube extending rearwardly from the rear extremity of said main tube, said parallax adjusting tube having axial slots at its forward end; an eyepiece mount; adjustable mounting means mounting said eyepiece mount on the rear extremity of said parallax adjusting tube so as to move axially as a unit with the latter; an erector tube concentrically positioned in said parallax adjusting tube in spaced relation to the walls of the latter; universal hinge means securing the rear extremity of said erector tube within the rear extremity of the parallax adjusting tube; screw actuator means extending through the main tube for swinging the forward extremity of said erector tube within said parallax adjusting tube, said screw means passing through the slots in the forward end of the parallax tube to permit axial sliding thereof within said main tube; a reticle mounted on the forward extremity of said erector tube; an erector lens combination mounted in said erector tube rearwardly of said reticle; a cylindrical parallax adjusting sleeve having a first internally threaded portion and a second internally threaded portion spaced axially therefrom, said first portion being threaded directly onto the rearward extremity of the main tube and extending rearwardly from the latter; and external threads formed on the rearward extremity of said parallax adjusting tube and engaging the second internally threaded portion of said adjusting sleeve so that rotation of said sleeve will cause axial movement of said parallax adjusting tube within said main tube.

2. A telescopinc gun sight as recited in claim 1 in which the first internal threads in said parallax adjusting sleeve which engage the threads on the main tube are of a different lead than the second internal threads therein which engage the threads on the parallax adjusting tube so as to effect a differential movement between said main tube and said parallax adjusting tube when said sleeve is rotated.

3. A telescopic gun sight as described in claim 2 having an enlargement formed on the rearwardly projecting extremity of said parallax adjusting tube said enlargement substantially corresponding in external diameter to the external diameter of said main tube so that the threads on the main tube and the enlargement will be in substantially cylindrical alignment to receive the cylindrical parallax adjusting sleeve.

References Cited in the file of this patent

UNITED STATES PATENTS

| | | |
|---|---|---|
| 763,433 | Seelig | June 28, 1904 |
| 936,541 | Kellner | Oct. 12, 1909 |
| 2,696,052 | Czarnikow | Dec. 7, 1954 |
| 2,784,641 | Keuffel et al. | Mar. 12, 1957 |
| 2,858,732 | Kollmorgen et al. | Nov. 4, 1958 |
| 2,937,570 | Hillman | May 24, 1960 |
| 2,948,188 | Kollmorgen | Aug. 9, 1960 |

FOREIGN PATENTS

| | | |
|---|---|---|
| 16,791 | Great Britain | of 1900 |